(12) United States Patent
Bandy et al.

(10) Patent No.: US 10,388,087 B2
(45) Date of Patent: Aug. 20, 2019

(54) SYSTEM AND METHOD FOR IMPROVED HEALTH MANAGEMENT AND MAINTENANCE DECISION SUPPORT

(71) Applicant: Sikorsky Aircraft Corporation, Stratford, CT (US)

(72) Inventors: Isaac Bandy, St. Louis Park, MN (US); James P. Cycon, Media, PA (US); James N. Rozak, Cheshire, CT (US); Mark W. Davis, Southbury, CT (US); Gregory J. Kacprzynski, Fairport, NY (US); Nicholos A. Mackos, Albuquerque, NM (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 6 days.

(21) Appl. No.: 15/301,623

(22) PCT Filed: Apr. 2, 2015

(86) PCT No.: PCT/US2015/024011
§ 371 (c)(1),
(2) Date: Oct. 3, 2016

(87) PCT Pub. No.: WO2015/199782
PCT Pub. Date: Dec. 30, 2015

(65) Prior Publication Data
US 2017/0186249 A1   Jun. 29, 2017

Related U.S. Application Data

(60) Provisional application No. 61/974,146, filed on Apr. 2, 2014.

(51) Int. Cl.
*G07C 5/08* (2006.01)
*G06Q 10/00* (2012.01)
*G07C 5/00* (2006.01)

(52) U.S. Cl.
CPC ........... *G07C 5/0808* (2013.01); *G06Q 10/20* (2013.01); *G07C 5/006* (2013.01); *G07C 5/008* (2013.01); *G07C 5/0816* (2013.01)

(58) Field of Classification Search
CPC ...... G07C 5/006; G07C 5/008; G07C 5/0808; G07C 5/0816; G06Q 10/20
See application file for complete search history.

(56) References Cited

U.S. PATENT DOCUMENTS

| 6,847,917 | B2 | 1/2005 | Bechhoefer | |
|---|---|---|---|---|
| 8,175,846 | B2 * | 5/2012 | Khalak | G06Q 50/22 702/181 |

(Continued)

OTHER PUBLICATIONS

International Search Report and Written Opinion issued by the International Searching Authority dated Jan. 4, 2016 in related PCT Application No. PCT/US2015/024011, 10 pages.

(Continued)

*Primary Examiner* — Mussa A Shaawat
(74) *Attorney, Agent, or Firm* — Cantor Colburn LLP

(57) ABSTRACT

A method of health management of a monitored system includes collecting component condition indicator data used to calculate a plurality of component health indicators. Component fault severity and potential failure modes are determined utilizing the component condition indicator data. The potential failure modes are ranked in order of likelihood to isolate the failure mode. A system of health management for monitored apparatus includes a fault severity module to derive a plurality of component health indicators from collected component condition indicator data, the plurality of component health indicators indicative of fault severity of a plurality of components. A fault isolation module separately derives a ranked listing of potential fault/failure modes utilizing the component condition indicator data. The system further includes a communication portion to which (Continued)

the plurality of component health indicators and the ranked listing of fault/failure modes are transmitted for review and/or action by cognizant personnel.

19 Claims, 3 Drawing Sheets

(56) References Cited

U.S. PATENT DOCUMENTS

| | | | |
|---|---|---|---|
| 2006/0161819 A1* | 7/2006 | Nissan-Messing | G06F 11/0793 714/48 |
| 2007/0150119 A1* | 6/2007 | Mitchell | G06Q 10/10 701/1 |
| 2007/0260726 A1 | 11/2007 | Rozak et al. | |
| 2008/0086554 A1* | 4/2008 | Royalty | H04L 63/1408 709/224 |
| 2008/0133178 A1 | 6/2008 | Byrne et al. | |
| 2009/0300430 A1* | 12/2009 | Nissan-Messing | G06F 11/0739 714/48 |
| 2010/0106462 A1* | 4/2010 | Liu | G01M 15/14 702/185 |
| 2010/0161154 A1* | 6/2010 | Moeckly | F01D 21/003 701/3 |
| 2010/0161196 A1 | 6/2010 | Goericke et al. | |
| 2012/0022762 A1 | 1/2012 | Rosero | |
| 2012/0323518 A1* | 12/2012 | Lechtenberg | G06Q 10/20 702/108 |
| 2013/0097459 A1* | 4/2013 | Bell | G05B 23/0213 714/37 |
| 2014/0095939 A1* | 4/2014 | Bell | G06F 11/3495 714/39 |

OTHER PUBLICATIONS

European Search Report; Application No./Patent No. 15811394.4-1958/ 3126980; dated Sep. 7, 2017; 7 pages.

International Search Report and Written Opinion issued by the International Searching Aurthority in related PCT Application No. PCT/US2015/0240111 dated Jan. 4, 2016, 10 pages.

\* cited by examiner

SYSTEM AND METHOD FOR IMPROVED HEALTH MANAGEMENT AND MAINTENANCE DECISION SUPPORT

CROSS-REFERENCE TO RELATED APPLICATIONS

The present application is a 371 National Stage of International Application No. PCT/US2015/024011, filed on Apr. 2, 2015, which claims priority to U.S. Provisional Application 61/974,146, filed on Apr. 2, 2014, the contents of which are incorporated by reference herein in their entirely.

FEDERAL RESEARCH STATEMENT

This invention was made with government support with the United States Army under Contract No. W911W6-10-2-0006. The government therefore has certain rights in this invention.

BACKGROUND

The present disclosure relates to rotary winged aircraft. More specifically, the present disclosure relates to health assessment of systems and components of a rotary wing aircraft.

On-board systems for health management of aircraft have to-date focused on component-specific anomaly detection and diagnoses in isolation from other component diagnostic considerations. Prior technologies include mechanical diagnostics, bearing diagnostics, and rotor track and balance algorithms that detect diagnostic features and calculate condition indicators (CIs), which are designed to indicate when a mechanical part is failed or failing. Further, algorithms are used to detect statistical anomalies in data. Fault isolation reasoners are utilized to manage and reduce built-in-test and fault codes available from avionic components into likely sources of component errors. Finally, ground-based software is used to process and display data taken on aircraft, with ground-based software architectures to integrate and display all of the above information using various data models and schemas. However, higher-level (e.g., sub-system and system) interactions and decision-making has been only possible with a human in the loop interpretation of various data sources. The value extracted from today's health monitoring systems is often limited by the experience and understanding maintenance personnel possess regarding health management system outputs and component/sub-system/system level interdependencies. To maximize the value of health management systems in achieving reliable and cost/time efficient condition-based maintenance objectives, automated processes are required that can address these interdependencies and provide specific actionable maintenance recommendations to various end-users of health management system output.

BRIEF SUMMARY

In one embodiment, a method of health management of a monitored system includes collecting component condition indicator data from a plurality of system components and calculating a plurality of component health indicators utilizing the condition indicator data. Component fault severity is determined from the plurality of component health indicators and potential failure modes are determined utilizing the component condition indicator data. The potential failure modes are ranked in order of likelihood to isolate the failure mode.

Additionally or alternatively, in this or other embodiments component health indicators are collected into a plurality of sub-system health indicators for a plurality of sub-systems within the monitored system and sub-system fault severity is determined from the plurality of sub-system health indicators.

Additionally or alternatively, in this or other embodiments component and sub-system health indicators are collected into a plurality of system health indicators, and system fault severity is determined from the plurality of system health indicators.

Additionally or alternatively, in this or other embodiments the sub-system and system health indicators are calculated by assessing the sub-system and system condition indicator data relative to safety, mission impact and respective sub-system and system functionality.

Additionally or alternatively, in this or other embodiments the component health indicators are calculated by assessing the component condition indicator data relative to safety, mission impact and component functionality.

Additionally or alternatively, in this or other embodiments wherein determining the potential failure modes includes comparing the component condition indicator data to a dependency model listing of all potential failure modes and corresponding expected component condition indicator data, and selecting likely failure modes from the listing of all potential failure modes via the comparison.

Additionally or alternatively, in this or other embodiments the dependency model considers interactions between a plurality of components and a plurality of sub-systems of the monitored system when listing all potential failure modes.

Additionally or alternatively, in this or other embodiments the plurality of component health indicators and the ranked listing of potential failure modes are transmitted to various end users for review and/or action by one or more of system operator(s), maintenance personnel, and cognizant engineering personnel.

Additionally or alternatively, in this or other embodiments the component condition indicator data are utilized to derive a recommended maintenance action list.

Additionally or alternatively, in this or other embodiments the recommended maintenance action list is cross-referenced with the ranked potential failure modes resulting in a ranked corrective action listing.

Additionally or alternatively, in this or other embodiments the ranked corrective action listing is transmitted to system operator(s), maintenance personnel, and cognizant engineering personnel for review and/or action by said personnel.

In another embodiment, a system of health management for monitored apparatus includes a fault severity module to derive a plurality of component health indicators from collected component condition indicator data, the plurality of component health indicators indicative of fault severity of a plurality of components. A fault isolation module separately derives a ranked listing of potential fault/failure modes utilizing the component condition indicator data. The system further includes a communication portion to which the plurality of component health indicators and the ranked listing of fault/failure modes are transmitted for review and/or action by cognizant personnel.

Additionally or alternatively, in this or other embodiments the fault severity module is further configured to collect component health indicators into a plurality of system health indicators and determine system fault severity from the plurality of system health indicators.

Additionally or alternatively, in this or other embodiments the fault severity module assesses the component condition indicator data relative to safety, mission impact and component functionality to determine the plurality of component health indicators.

Additionally or alternatively, in this or other embodiments the fault isolation module is configured to compare the component condition indicator data to a dependency model listing of all potential failure modes and corresponding expected component condition indicator data and select likely failure modes from the listing of all potential failure modes via the comparison.

Additionally or alternatively, in this or other embodiments the dependency model is configured to consider interactions between components and systems of the apparatus in the listing of all potential failure modes.

Additionally or alternatively, in this or other embodiments a maintenance reasoner is configured to utilize the component condition indicator data to derive a recommended maintenance action list.

Additionally or alternatively, in this or other embodiments the fault isolation module is further configured to cross-reference the recommended maintenance action list with the ranked potential failure modes resulting in a ranked corrective action listing.

Additionally or alternatively, in this or other embodiments the ranked corrective action listing is transmitted to apparatus operator(s), maintenance personnel, and cognizant engineering personnel for review and/or action by said personnel.

Additionally or alternatively, in this or other embodiments portions of the health management and decision support methods are performed within or onboard the monitored apparatus and portions are performed offboard.

Additionally or alternatively, in this or other embodiments selected methods are performed both onboard and offboard the monitored apparatus to enable refinement of maintenance recommendations taking into account the results of offboard inspections, other diagnostic evidence or other considerations such as fleet statistics of fault likelihood.

Additionally or alternatively, in this or other embodiments health management and decision support output is transmitted from the onboard portions of the system to the offboard portion of the system.

Additionally or alternatively, in this or other embodiments the monitored apparatus is an aircraft.

Additionally or alternatively, in this or other embodiments the offboard portion of the system is a ground-based system.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
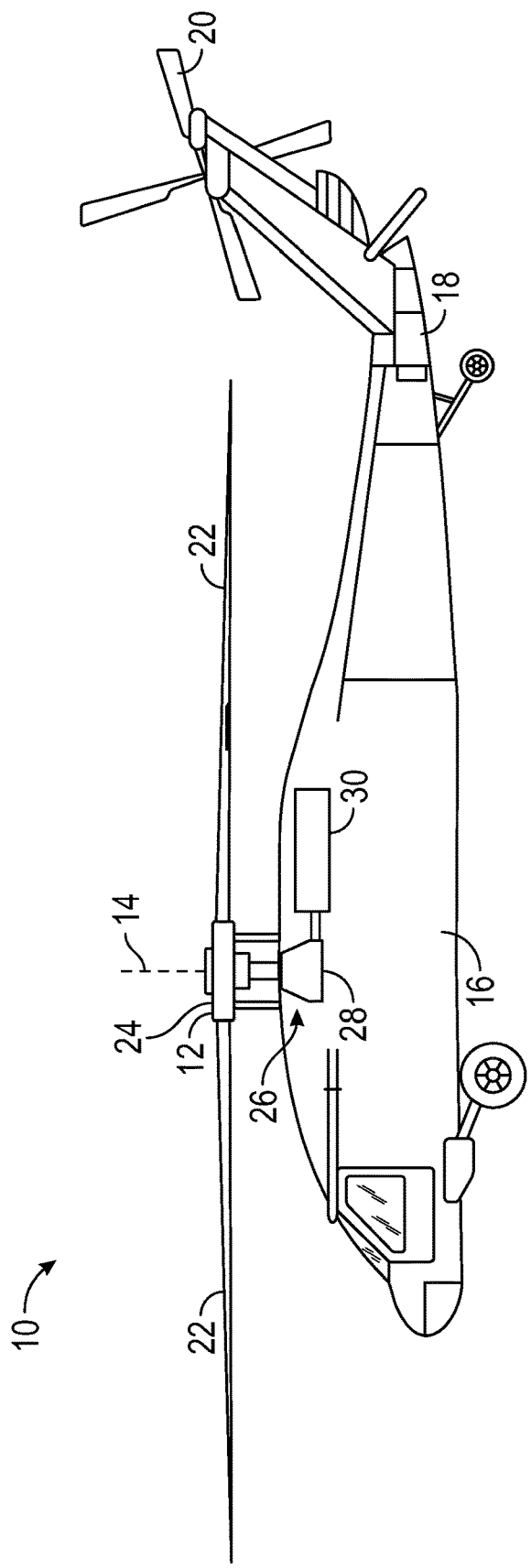
FIG. 1 is a general side view of an exemplary rotary wing aircraft for use in accordance with embodiments.

FIG. 1 illustrates an exemplary rotary-winged aircraft 10 having a main rotor system 12, which rotates about a rotor axis 14. The aircraft 10 includes an airframe 16 which supports the main rotor system 12 as well as an extending tail 18 including a tail rotor 20. The main rotor system 12 includes a plurality of rotor blade assemblies 22 mounted to a rotor hub assembly 24. The main rotor system 12 is driven by a transmission 26. The transmission 26 includes a main gearbox 28 driven by one or more engines, illustrated schematically at 30. The main gearbox 28 and engines 30 are considered as part of the non-rotating frame of the aircraft 10. Although a particular rotary wing aircraft configuration is illustrated and described in the disclosed non-limiting embodiment, other configurations and/or machines with rotor systems are within the scope of the present invention. Further, one skilled in the art will readily appreciate that the present disclosure may be utilized in other, non-rotary winged aircraft applications.

Figure 2:
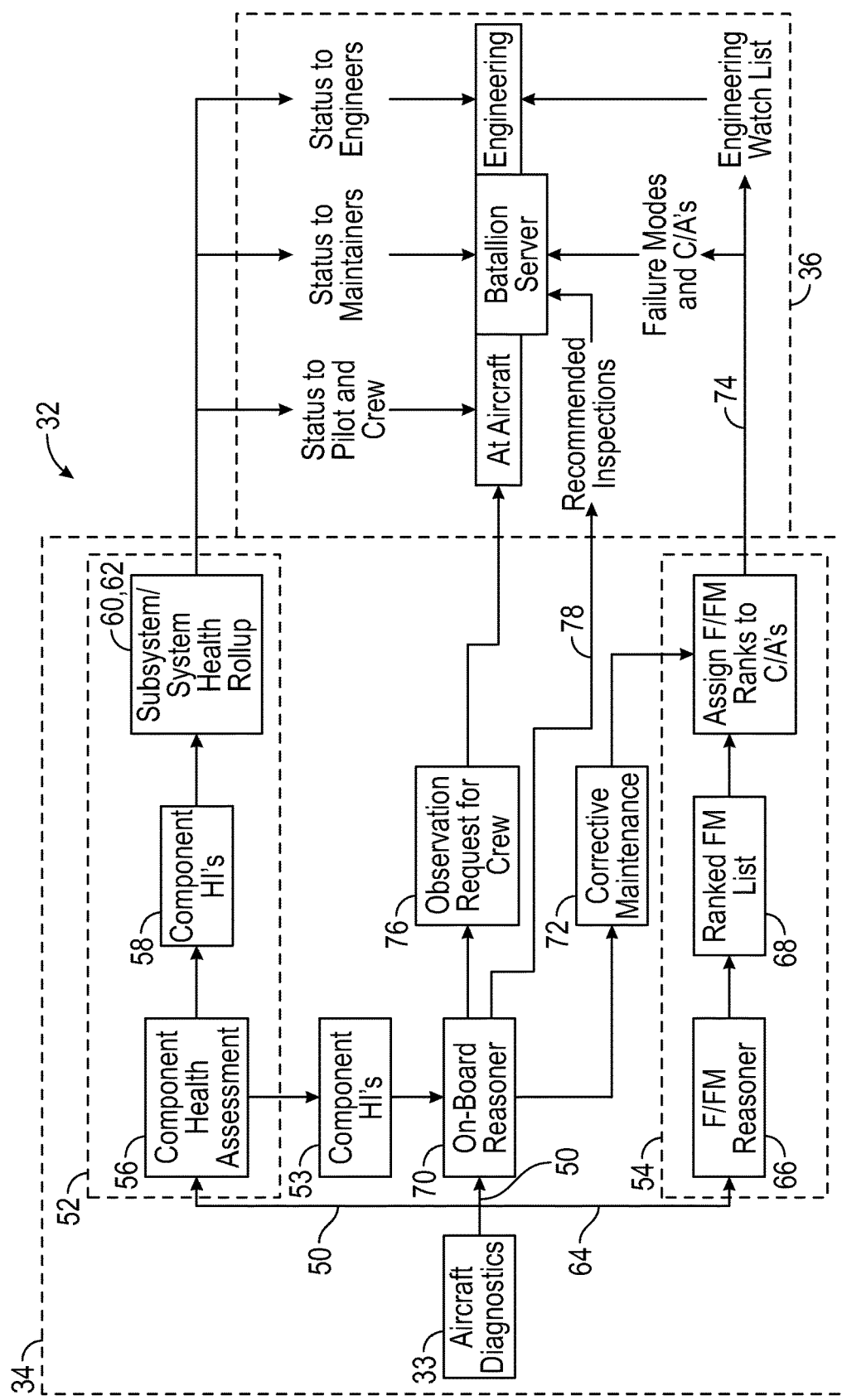
FIG. 2 is a schematic view of an exemplary embodiment of a health management and maintenance decision support system for an aircraft.
Figure 3:
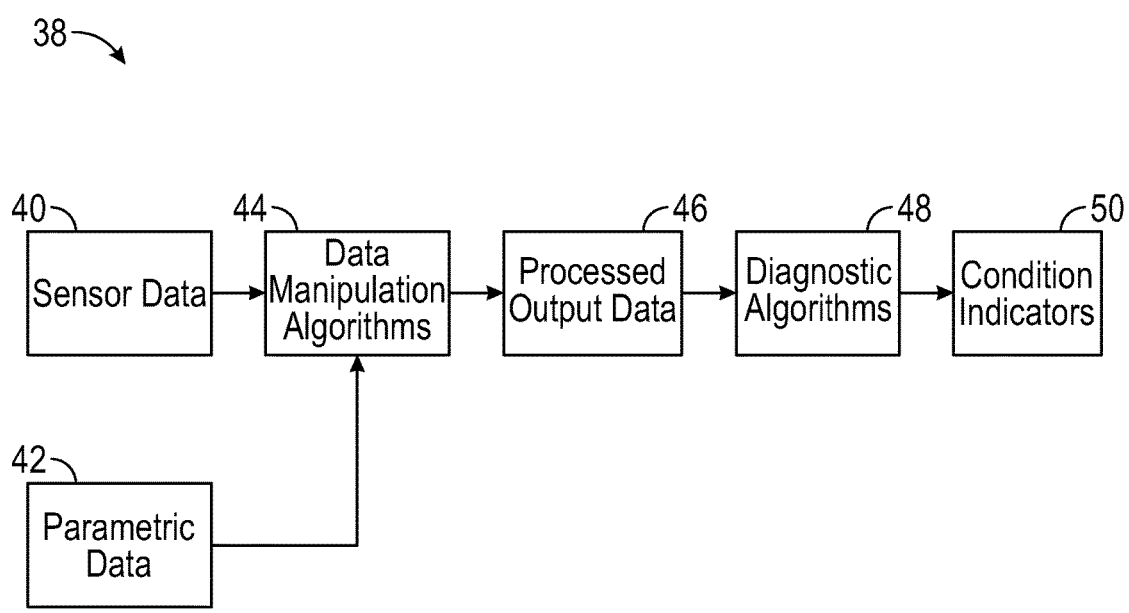
FIG. 3 is a schematic view of an exemplary embodiment of a diagnostic process for a health management system.

Referring now to FIG. 2, an exemplary health management and maintenance decision support system 32 is schematically illustrated. The health management and maintenance decision support system 32 includes an onboard portion 34 located onboard the aircraft 10, and a ground based portion 36 located remotely from the aircraft 10, for example, at a ground based computing device such as a laptop computer, smart phone or other device. The onboard portion 34 includes a plurality of subsystem diagnostic processes 38, which collect and process data from a number of aircraft 10 subsystems including, for example, drivetrain, engines, hydraulics, airframe, rotors, electrical power and/or wiring, and an on-aircraft reasoner. Referring to FIG. 3, an exemplary diagnostic process 38 is illustrated. The diagnostic process 38 collects data from subsystem components, often in the form of sensor data 40 specific to particular components or sub-components. In some embodiments, the diagnostic process 38 also utilizes aircraft parametric data 42, such as aircraft states, velocities or accelerations. The subsystem diagnostic process 38 processes the data 40, 42 using one or more data manipulation algorithms 44 to, for example, filter, synchronize, de-noise, or harmonically analyze the data, and provides a set of processed output data 46. The processed output data 46 are further processed at a diagnostic algorithm 48, which detects or extracts diagnostic features from the processed output data and calculates a component-specific condition indicator (CI) 50 for one or more failure modes for each component.

Referring again to FIG. 2, the CIs 50 are utilized to separately assess fault severity at a fault severity module 52, and to isolate faults in fault isolation module 54. In the fault severity module 52, the CIs 50 are input into a component health assessment module 56, which outputs a component health indicator (HI) 58 as an indicator of component fault severity. In this assessment, the component health assessment module 56 assesses the CIs 50 relative to their impact on factors such as safety, mission impact and functionality, in that order, to determine the component health indicator 58. The component health indicators (HIs) 58 are then collected or rolled-up by subsystem, and then by system (i.e., aircraft) into subsystem health indicators 60 and system health indicators 62, respectively, utilizing the same safety, mission impact and functionality criteria. The subsystem health indicators 60 and system health indicators 62 are indicative of subsystem and system fault severity, respectively, and how soon associated maintenance is required, which is a function of the impact on not only component functionality, but also sub-system, system/aircraft functionality.

In the fault isolation module 54, a data driven approach including a system dependency model, which considers interactions between systems and subsystems, is utilized to list and rank potential failure modes to isolate the likely cause of an anomalous value for a particular CI 50. At the fault isolation module 54, the CIs 50 are converted into Boolean CIs 64, to indicate merely "fault" or "no fault". These Boolean CIs 64 are input into a fault/failure mode reasoner 66. The fault/failure mode reasoner 66 utilizes a dependency model describing known links between each potential fault/failure mode and evidence expected to be active when present. The reasoner 66 mathematically evaluates the set of known active and inactive evidence states within the context of the dependency model, and outputs a ranked list of most likely fault/failure modes 68.

In some embodiments, the onboard portion 34 further includes a maintenance reasoner 70 that maps potential component faults to maintenance actions. The maintenance reasoner 70 utilizes CIs 50 and component health indicators 58 to derive a recommended maintenance action list 72 to correct any faults indicated by the CIs 50 and the component health indicators 58. This recommended maintenance action list 72 is cross-referenced with the list of most likely fault/failure modes 68 to produce a ranked corrective action list 74.

The ranked corrective action list 74, along with the component health indicators 58, subsystem health indicators 60, and system health indicators 62 are transmitted, either through a wired or wireless connection, to the ground based portion 36 for review and/or action by various ground personnel and end-users of the health management system data and maintenance recommendations. The health indicators 58, 60, 62 comprise "severity" information, where higher indicated fault severity results in an increased urgency to take action to resolve the fault. In addition to, in some instances, providing an alert to the flight crew of the aircraft 10 when the fault is initially discovered, the health indicator 58, 60, 62 are provided to maintenance personnel for review to aid in prioritizing and scheduling maintenance tasks, and to engineering personnel who monitor fleet status, provide engineering support, and identify fleet-wide issues that may require proactive resolution. This hierarchical approach for fault detection, isolation, and severity assessment enables getting timely, specific actionable information to the appropriate end-user of the system at the right time. For example, the pilot or crew need to know if a fault jeopardizes the safety of the aircraft or mission, but not that a non-critical fault should be corrected at the next convenient opportunity.

The ranked corrective action list 74 essentially comprises what maintenance actions to take on the aircraft 10, and is provided to maintainers via the ground based portion 36. The maintainers can readily understand what maintenance actions are required and how soon they need to be taken by comparing the correction action list 74 with the HIs 58, 60, and 62. Further, the ranked corrective action list 74 may be input into an engineering watch list, and/or used for refinement of the fault/failure mode reasoner 66 algorithm. Further, as part of the ground based portion 36, the flight crew are provided with a list of observation requests 76, if any are required, to perform prior to leaving the aircraft 10, and maintenance personnel are provided with a recommended inspection list 78 of conditions to review or components to inspect on the aircraft 10, if any are required. The results of these inspections are reported into instantiations of the same diagnostics algorithms and diagnostic reasoner executed in the ground-based system, for example, at the Battalion server. This allows further refinement of the outputs of the health management and decision support system if further diagnostic evidence is required to reduce any ambiguity and definitively identify root cause(s) and corrective actions.

Separating severity assessment from fault isolation in this way allows for different algorithmic approaches to be used to arrive at the results of the severity assessment and the fault isolation. Further, the system's hierarchical approach for assessing diagnosing faults and fault severity across sub-systems and at the system level, utilizing inter-system dependencies, provides better fault isolation and fault severity assessment, and appropriate timely communication of results to different end-users. This allows the system to be both reliable in calling for specific appropriate action when a severe fault occurs, and cost effective by not replacing components or performing maintenance more often than necessary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, some of the functionality shown as being performed onboard the aircraft, could readily be performed in the ground-based portion of the system. Additionally, while various embodiments of the invention have been described, it is to be understood that aspects of the invention may include only some of the described embodiments. Finally, it should be clear to those skilled in the art that the system and methods described herein are applicable to any system for which health management and maintenance decision support are desired. Accordingly, the invention is not to be seen as limited by the foregoing description, but is only limited by the scope of the appended claims.

What is claimed is:

1. A method of health management of a monitored system comprising:
   collecting component condition indicator data from a plurality of system components;
   calculating a plurality of component health indicators utilizing the condition indicator data;
   determining component fault severity from the plurality of component health indicators;
   determining potential failure modes utilizing the component condition indicator data;
   determining links between each of the potential failure modes and evidence expected to be active when present;
   evaluating active and in-active evidence states of the evidence;
   ranking the potential failure modes in order of likelihood based, at least in part, of the active and in-active evidence;
   outputting a ranked list of the most likely potential failure modes; and
   outputting a ranked corrective action list including actions necessary to correct the potential fault modes to cognizant personnel.

2. The method of claim 1, further comprising:
collecting component health indicators into a plurality of sub-system health indicators for a plurality of sub-systems within the monitored system; and
determining sub-system fault severity from the plurality of sub-system health indicators.

3. The method of claim 2, further comprising:
collecting component and sub-system health indicators into a plurality of system health indicators; and
determining system fault severity from the plurality of system health indicators.

4. The method of claim 3, wherein the sub-system and system health indicators are calculated by assessing the sub-system and system condition indicator data relative to safety, mission impact and respective sub-system and system functionality.

5. The method of claim 1, wherein the component health indicators are calculated by assessing the component condition indicator data relative to safety, mission impact and component functionality.

6. The method of claim 1, wherein determining the potential failure modes comprises:
comparing the component condition indicator data to a dependency model listing of all potential failure modes and corresponding expected component condition indicator data; and
selecting likely failure modes from the listing of all potential failure modes via the comparison.

7. The method of claim 6, wherein the dependency model considers interactions between a plurality of components and a plurality of sub-systems of the monitored system when listing all potential failure modes.

8. The method of claim 1, further comprising transmitting the plurality of component health indicators and the ranked listing of potential failure modes to various end users for review and/or action by one or more of system operator(s), maintenance personnel, and cognizant engineering personnel.

9. The method of claim 1, further comprising transmitting the ranked corrective action listing to system operator(s), maintenance personnel, and cognizant engineering personnel for review and/or action by said personnel.

10. A system of health management for monitored apparatus, comprising:
a fault severity module to derive a plurality of component health indicators from collected component condition indicator data, the plurality of component health indicators indicative of fault severity of a plurality of components;
a fault isolation module to separately derive a ranked listing of potential fault/failure modes utilizing the component condition indicator data, determine links between each of the potential failure modes and evidence expected to be active when present, evaluate active and in-active evidence states of the evidence and rank the potential failure modes in order of likelihood based, at least in part, of the active and in-active evidence;
a maintenance reasoner that operates to produce a ranked corrective action list including actions necessary to correct the potential fault mode; and
a communication portion to which the plurality of component health indicators, the ranked listing of fault/failure modes, and the ranked corrective action list are transmitted for review and/or action by cognizant personnel.

11. The system of claim 10, wherein the fault severity module is further configured to:
collect component health indicators into a plurality of system health indicators; and
determine system fault severity from the plurality of system health indicators.

12. The system of claim 10, wherein the fault severity module assesses the component condition indicator data relative to safety, mission impact and component functionality to determine the plurality of component health indicators.

13. The system of claim 10, wherein the fault isolation module is configured to:
compare the component condition indicator data to a dependency model listing of all potential failure modes and corresponding expected component condition indicator data; and
select likely failure modes from the listing of all potential failure modes via the comparison.

14. The system of claim 13, wherein the dependency model is configured to consider interactions between components and systems of the apparatus in the listing of all potential failure modes.

15. The system of claim 10, wherein portions of the health management and decision support methods are performed within or onboard the monitored apparatus and portions are performed offboard.

16. The system of claim 10, wherein selected methods are performed both onboard and offboard the monitored apparatus to enable refinement of maintenance recommendations taking into account the results of offboard inspections, other diagnostic evidence or other considerations such as fleet statistics of fault likelihood.

17. The system of claim 15, further comprising the transmitting of health management and decision support output from the onboard portions of the system to the offboard portion of the system.

18. The system of claim 10, wherein the monitored apparatus is an aircraft.

19. The system of claim 18, wherein the offboard portion of the system is a ground-based system.

* * * * *